United States Patent [19]

Iwasaki et al.

[11] 4,305,838

[45] Dec. 15, 1981

[54] PROCESS FOR REMOVING ALDEHYDE FROM DISPERSIONS OF MICROCAPSULES

[75] Inventors: Hiroshi Iwasaki; Shinsuke Irii, both of Amagasaki, Japan

[73] Assignee: Kanzaki Paper Manufacturing Company, Limited, Tokyo, Japan

[21] Appl. No.: 78,081

[22] Filed: Sep. 24, 1979

[30] Foreign Application Priority Data

Sep. 27, 1978 [JP] Japan ............................. 53-119789
Jan. 23, 1979 [JP] Japan ............................. 54-7328

[51] Int. Cl.³ ..................................... B01J 13/02
[52] U.S. Cl. ............................. 252/316; 282/27.5; 427/151; 428/914; 428/320.6; 260/29.6 R
[58] Field of Search ............................. 252/316

[56] References Cited

U.S. PATENT DOCUMENTS

| | | | |
|---|---|---|---|
| 3,141,792 | 7/1964 | Lachman et al. | 424/31 X |
| 4,087,376 | 5/1978 | Fóris et al. | 252/316 |
| 4,087,581 | 5/1978 | Vincent et al. | 252/316 X |

FOREIGN PATENT DOCUMENTS

| | | | |
|---|---|---|---|
| 44-27254 | 11/1969 | Japan | 252/316 |
| 51-75676 | 6/1976 | Japan | 252/316 |
| 1090971 | 11/1967 | United Kingdom | 252/316 |

*Primary Examiner*—Richard D. Lovering
*Attorney, Agent, or Firm*—Armstrong, Nikaido, Marmelstein & Kubovcik

[57] ABSTRACT

The present invention relates to a process for removing an aldehyde from dispersions containing the aldehyde by introducing a gas into the dispersion.

9 Claims, No Drawings

PROCESS FOR REMOVING ALDEHYDE FROM DISPERSIONS OF MICROCAPSULES

This invention relates to a process for removing an aldehyde from microcapsule dispersions containing the aldehyde.

In recent years great progress has been made in techniques for preparing microcapsules which are widely used for example in pressure sensitive manifold paper. Microcapsules are prepared by coacervation, interfacial polymerization, in-situ polymerization and various other processes. It is known to prepare microcapsule wall-forming films from compositions comprising an aldehyde. The films have outstanding properties and are therefore very desirable. For preparing micro-capsules with use of an aldehyde, various processes are also known including those in which the aldehyde is used for effecting a cross-linking reaction. For example, microcapsules are produced by curing a coacervate of gelation with formaldehyde, glutaraldehyde or the like (U.S. Pat. No. 2,800,457 and 2,800,458), or by preparing a coacervate from polyvinyl alcohol and polyhydroxyphenol and reacting the coacervate with an aldehyde (Published Examined Japanese patent application No. 51714/1972). Also proposed are various processes utilizing a reaction in which a polycondensation resin is formed from an aldehyde. They include a process in which an amine and an aldehyde are subjected to in-situ polycondensation (South African patent No. 62-939 and U.S. Pat. No. 3,516,941), a process in which urea and formaldehyde are subjected to polycondensation with use of a modifying agent to form a capsule wall-forming film from the resulting resin (Published Unexamined Japanese patent application No. 9079/1976), a process in which the polycondensation of an aldehyde is effected efficiently at the interface between oil and water utilizing chemical or physiochemical linkage (Published Examined Japanese patent applications Nos. 12380/1962, 12518/1963 and 4717/1973), a process in which a composite capsule wall-forming film is prepared from a hydrophilic polymer and a suspendable polymer which is produced by the reaction of polyhydroxyphenol with an aldehyde (British Pat. No. 1,190,721), a process in which an aldehyde and polyhydroxyphenol combined with polyvinyl alcohol are subjected to aggregation reaction to form a capsule wall-forming film from the resulting polymer (Published Unexamined Japanese Patent Application No. 57892/1973), and a process in which a polyamine and an aldehyde are subjected to interfacial polycondensation (Published Unexamined Japanese Pat. application No. 20069/1972).

These processes use various aldehydes such as formaldehyde, acetaldehyde, butyraldehyde, glyoxal, glutaraldehyde, crotonaldehyde, benzaldehyde, acrolein, furfural, etc. as a component for forming the microcapsules. Such aldehydes have a characteristic pungent odor and are toxic to the human body, so that stringent regulations are adopted, for example, for formaldehyde, the most typical of the compounds. It is therefore required that the dispersion of capsules prepared be free from any residual aldehyde. The foregoing processes, nevertheless, necessitate the use of an excess of aldehyde when preparing the desired capsule wall-forming films, invariably permitting part of the aldehyde to remain in the resulting capsule dispersion. Consequently the dispersion is still in greatly limited use despite the excellent properties of the capsules formed.

Processes for removing formaldehyde from dispersions of capsules are known. For example, it has been proposed to treat the capsule dispersion with urea or sodium sulfite (Published Examined Japanese patent application No. 27254/1969), or to add hydroxylamine hydrochloride or like formaldehyde absorbing agent to the capsule dispersion (Published Unexamined Japanese patent application No. 75676/1976), but since these processes fail to fully remove the aldehyde and need the use of a special chemical, the capsule dispersion obtained has the attendant drawback of having limited uses and is not always satisfactory.

The main object of this invention is to provide a process for removing the residual aldehyde from microcapsule dispersions without using any special chemical.

Another object of the invention is to provide a process for removing the residual aldehyde from microcapsule dispersions by a very simple procedure with high efficiency.

Another object of the invention is to provide a process for removing the residual aldehyde from microcapsule dispersions without degrading the microcapsules in any way.

These and other objects and features of the invention will become apparent from the following description.

The process of the present invention is characterized in that a gas is introduced into a microcapsule dispersion containing a capsule wall-forming film formed with use of an aldehyde.

According to this invention, microcapsule dispersions are those containing microcapsules formed typically of an aldehyde polycondensation resin film or aldehyde-cross-linked film. Various known films of aldehyde polycondensation resins and cross-linked products of aldehydes are usable. Examples of useful resin films are those made of urea-formaldehyde resin, melamine-formaldehyde resin, urea-melamine-formaldehyde resin, urea-formaldehyde-acetaldehyde resin, urea-phenol-formaldehyde resin, polyamine-formaldehyde resin, polyhydroxyphenol-formaldehyde-polyvinyl alcohol resin, etc. Examples of useful cross-linked films are a film prepared by cross-linking formaldehyde with a gelatincarboxy methyl cellulose coacervation film, a film prepared by cross-linking glutaraldehyde with a gelatin-gum arabic coacervation film, a film prepared by cross-linking formaldehyde with a simple coacervation film of polyvinyl alcohol, etc. The process for preparing the dispersion containing any of such capsule wall-forming films is in no way limited; any of various known processes is useful.

The microcapsule dispersion is prepared at a usual concentration, for example, of 1 to 50% by weight, preferably 5 to 40% by weight.

The microcapsule dispersion contains part of the aldehyde used for forming the microcapsules. Examples of such aldehydes are formaldehyde, acetaldehyde, butyraldehyde, glyoxal, glutaraldehyde, crotonaldehyde, benzaldehyde, acrolein, furfural, etc. The dispersion contains about 0.05 to about 5% by weight of such aldehyde.

According to the invention, a gas is introduced into the microcapsule dispersion, whereby the aldehyde remaining in the dispersion can be removed effectively along with the gas passing through the dispersion. The gases useful for this purpose are steam and inert gases, which are substantially inert to the capsules, such as nitrogen, helium, argon, carbon dioxide, air, etc.

The remaining aldehyde, although effectively removable merely by introducing such a gas into the dispersion, can be removed more effectively when the treatment is conducted with the dispersion maintained at reduced pressure or at an elevated temperature of at least 50° C.

When steam is used as the gas, or when an inert gas is introduced into the microcapsule dispersion as heated to a temperature of at least 70° C., especially at least 90° C., there is the likelihood that the capsule wall-forming film will be degraded depending on the kind of the film. To avoid the possible objection, the dispersion is preferably a dispersion comprising a capsule wall-forming film of aldehyde polycondensation resin prepared with use of an acid catalyst. It is also desired to adjust the dispersion to a pH of at least 6.0, preferably 7.0 to 12.0. The microcapsules of such film can be produced by conducting aldehyde polycondensation under an acid condition of up to 6.0, preferably up to 5.5, in pH. Examples of useful acid catalysts for this reaction are formic acid, acetic acid, citric acid, p-toluenesulfonic acid, sulfamic acid, hydrochloric acid, sulfuric acid, nitric acid, phosphoric acid, ammonium sulfate, pectic acid, carboxymethyl cellulose, polyacrylic acid, maleic acid copolymer and like water-soluble acids, or salts of such water-soluble acids. These acid catalysts are used in an amount fulfilling the above acid condition.

Useful pH adjusting agents for the capsule dispersions thus prepared are hydroxides and carbonates of alkali metals such as sodium hydroxide and sodium carbonate, ammonia, water-soluble amines such as methyl amine, etc. Volatile amines are advantageous to use because they are removable with the gas passed through the dispersion.

With this invention, two or more kinds of inert gases are usable in combination, or at least one kind of inert gas is usable conjointly with steam.

To inhibit the degradation of the capsule wall-forming film, it is advantageous to conduct the present process in the presence of a water-soluble protective colloid incorporated into the microcapsule dispersion in an amount of at least 0.5% by weight, preferably at least 1% by weight, of the dispersion. Exemplary of useful protective colloids are hydrolyzed product of a copolymer of maleic anhydride and some other polymerizable vinyl monomer, and a high-molecular-weight electrolyte of a polymer or copolymer of acrylic acid or methacrylic acid. Although the colloidal substance used for the preparation of the capsules is usable for the protecting purposes, it is preferable to add the desired protective colloid to the capsule dispersion.

The invention will be described below with reference to examples and comparison examples, in which the parts and percentages are all by weight unless otherwise specified.

EXAMPLES 1-4 and Comparison Examples 1-3

In a blending vessel equipped with a heater, 50 parts of a 10% aqueous solution of hydrolyzed ethylene-maleic anhydride copolymer (trade mark "EMA-31," product of Monsanto Co., U.S.A.) and 100 parts of water are mixed together by stirring, and the mixture is adjusted to a pH of 3.4 with 20% NaOH aqueous solution. To the mixture are added 5 parts of urea and 0.5 part of resorcin to prepare a uniform solution as a capsule-forming solution.

Separately 2.8 parts of crystal violet lactone and 0.7 part of benzoyl leuco methylene blue are dissolved in 100 parts of alkylnaphthalene (trade mark "KMC OIL," product of Kureha Chemical Industry K.K., Japan) to prepare an oily solution. The oily solution is added, as the core material to be encapsulated, to the capsule-forming solution to obtain an emulsion in which the oily solution is dispersed in the form of droplets $6\mu$ in mean diameter.

Subsequently 12.5 parts of 37% aqueous solution of formaldehyde is added to the emulsion, and the mixture is heated to 55° C. with gentle stirring, maintained at this temperature for 2 hours and then allowed to cool to obtain a capsule dispersion having a pH of 3.5.

The capsule dispersion is adjusted to a pH of 8.0 with sodium hydroxide. Portions of the dispersion are then treated under the conditions listed in Table 1 with use of nitrogen gas for Examples 1-4 and without use of nitrogen gas for Comparison Examples 1-3.

To each of the seven kinds of capsule dispersions thus prepared are added 8 parts (calculated as solids) of an aqueous solution of hydroxyethyl cellulose and 20 parts of finely divided cellulose, per 100 parts of the encapsulated core material to formulate a capsule-containing coating composition. The composition is then applied to paper, weighing 40 $g/m^2$, in an amount of 4 $g/m^2$ by dry weight and then dried with air to prepare top sheets (CB sheets) of pressure sensitive manifold paper.

Separately 65 parts of aluminum hydroxide, 20 parts of zinc oxide, 15 parts of a molten mixture (80:20) of zinc 3,5-di($\alpha$-methylbenzyl)salicylate and $\alpha$-methylstyrene-styrene copolymer, 5 parts (calculated as solids) of an aqueous solution of polyvinyl alcohol and 300 parts of water are treated in a ball mill for 24 hours to obtain a dispersion, to which is added 20 parts (as solids) of a carboxy-modified styrene-butadiene copolymer latex to obtain a color developer coating composition. The composition is applied to paper, weighing 40 $g/m^2$, in an amount of 5 $g/m^2$ by dry weight and then dried in air to prepare bottom sheets (CF sheets) of pressure sensitive manifold paper.

The capsule-containing coating composition is applied to some of the bottom sheets on one side of the sheet opposite to the color developer bearing side to obtain middle sheets (CFB sheets) of pressure sensitive manifold paper in the same manner as the top sheets.

The capsule dispersions are tested for properties by the following methods with use of the top sheets, middle sheets and bottom sheets. Table 1 also shows the results.

A. Quantitative determination of formaldehyde Small cut pieces of top sheet weighing 2.5 g are immersed in 100 ml of distilled water with heating at 40° C. for 1 hour to dissolve out solubles, and the water is then centrifuged at 4000 r.p.m. for 10 minutes to obtain a supernatant free from insolubles. A 5.0 ml quantity of acetylacetone solution is admixed with a 5.0 ml portion of the supernatant. The mixture is heated at 40° C. for 30 minutes and then allowed to stand for 30 minutes to obtain a specimen. The absorbancy of the specimen is measured at 415 nm. The concentration of formaldehyde is determined from a calibration curve for formaldehyde separately determined.

B. Capsule test

1. Heat resistance

Top and bottom sheets are superposed, with the coatings opposed to each other, and then maintained at 115° C. for 3 hours under 5 $kg/cm^2$ load. The color developer coating layer is thereafter checked for smudges due to color reaction.

2. Solvent resistance Middle sheets are allowed to stand in an atmosphere saturated with trichloroethylene at room temperature for 1 hour, and the color developer coating layer is thereafter checked for smudges due to color reaction.
3. Moisture resistance Three superposed middle sheets are subjected to 5 kg/cm² load for 3 days in an atmosphere at 50° C. and 90% RH, and the color developer coating layer on the interposed sheet is checked for smudges due to color reaction.

For the determination of the above properties, the degree of smudging is evaluated according to the following criteria:
A: Little or no smudging
B: Slight smudging
C: Marked smudging
The same criteria are used for all the other examples to follow.

TABLE 1

|  | N₂ gas | Treating time (min) | Temp. of dispersion (°C.) | Amount of formalin (ppm) | Capsule test Resistance to: | | |
|---|---|---|---|---|---|---|---|
|  |  |  |  |  | Heat | Solvent | Moisture |
| Comp. Ex. 1 | None | — | 15 | 180 | A | A | A |
| Ex. 1 | Used | 60 | 70 | 114 | A | A | A |
| Comp. Ex. 2 | None | (60)* | 70 | 181 | A | A | A |
| Ex. 2 | Used | 10 | 90 | 101 | A | A | A |
| Ex. 3 | Used | 30 | 90 | 87 | A | A | A |
| Ex. 4 | Used | 60 | 90 | 59 | A | A | A |
| Comp. Ex. 3 | None | (60)* | 90 | 176 | A | A | A |

Note:
*Heat treatment only without using nitrogen gas.

The result shown in Table 1 reveal that the process of the invention removes formaldehyde from the dispersions of Examples 1 to 4 very efficiently without degrading the capsules to any extent, affording fully useful pressure sensitive copy sheets.

EXAMPLES 5 AND 6

Steam is introduced into portions of the same capsule dispersion as prepared for the treatment of the foregoing examples, together with nitrogen gas (for Example (5) or without using nitrogen gas (for Example (6). The treatment is conducted under the conditions listed in Table 2, with the capsule dispersion adjusted to a pH of 6.5 with sodium hydroxide. Top sheets of pressure sensitive manifold paper are produced in the same manner as in the preceding examples except that the two kinds of dispersions thus treated are used. Determination of formaldehyde and capsule test are similarly conducted with the results given in Table 2.

TABLE 2

|  | N₂ gas | Steam | Treating time (min) | Amount of formalin (ppm) | Capsule test Resistance to: | | |
|---|---|---|---|---|---|---|---|
|  |  |  |  |  | Heat | Solvent | Moisture |
| Ex. 5 | Used | Used | 30 | 7 | A | A | A |
| Ex. 6 | None | Used | 30 | 42 | A | A | A |

Table 2 reveals that the residual aldehyde is efficiently removable in a short period of time without degrading the capsules.

EXAMPLE 7 AND COMPARISON EXAMPLES 4 AND 5

To 270 parts of water is added 30 parts of acid-treated gelatin, and the mixture is allowed to stand for 1 hour. With addition of 200 parts of water, the mixture is heated to 60° C. to obtain an aqueous gelation solution.

Separately 2 parts of crystal violet lactone and 1 part of benzoyl leuco methylene blue are dissolved in 100 parts of isopropylbiphenyl. The solution is heated to 60° C. and then added to the gelatin solution and dispersed therein by stirring in the form of oily droplets 4 to 5μ in mean diameter to prepare an emulsion.

Subsequently 300 parts of 10% aqueous solution of gum arabic is admixed with the emulsion, and 200 parts of water is further added to the mixture. The resulting system is adjusted to a pH of 4.3 with acetic acid to form a coacervate around each of the droplets. The system is then cooled to 10° C. to gel the coacervate. To the system is thereafter added 25 parts of 10% aqueous solution of formaldehyde. After allowing the system to stand for 5 minutes, the system is adjusted to a pH of 10 with dropwise addition of 10% aqueous solution of sodium hydroxide. Three hours thereafter, the cooling is discontinued. The system is gently stirred at room temperature for 12 hours to obtain a capsule dispersion having a pH of 7.0.

Nitrogen gas is introduced into a portion of the dispersion as heated to 55° C. for Example 7. Another portion of the dispersion is heated to 55° C. without introducing any nitrogen gas for Comparison Example 5. Another portion of the dispersion is not treated in any way for Comparison Example 4. Determination of formaldehyde and capsule test are conducted for these specimens in the same manner as in Example 1. Table 3 shows the results.

TABLE 3

|  | N₂ gas | Treating time (hours) | Temp. of dispersion (°C.) | Amount of formalin (ppm) | Capsule test Resistance to: | | |
|---|---|---|---|---|---|---|---|
|  |  |  |  |  | Heat | Solvent | Moisture |
| Comp. | None | — | 15 | 173 | A | A | B |

TABLE 3-continued

| | $N_2$ gas | Treating time (hours) | Temp. of dispersion (°C.) | Amount of formalin (ppm) | Capsule test Resistance to: | | |
|---|---|---|---|---|---|---|---|
| | | | | | Heat | Solvent | Moisture |
| Ex. 4 | | | | | | | |
| Ex. 7 | Used | 6 | 55 | 89 | A | A | B |
| Comp. Ex. 5 | None | 6 | 55 | 171 | A | A | B |

Table 3 reveals that the residual formaldehyde is efficiently removable from the dispersion of Example 7 without degrading the capsules.

EXAMPLE 8–11 AND COMPARISON EXAMPLES 6–8

In a blending vessel equipped with a heater, 50 parts of a 10% aqueous solution of ethylene-maleic anhydride copolymer (trade mark "EMA-31," Product of Monsanto Co., U.S.A.) and 100 parts of water are mixed together by stirring, and the mixture is adjusted to a pH of 4.0 with 20% NaOH aqueous solution.

Separately 2.8 parts of crystal violet lactone and 0.7 part of benzoyl leuco methylene blue are dissolved in 100 parts of alkylnaphthalene (trade mark "KMC OIL," product of Kureha Chemical Industry K.K., Japan) to prepare an oily solution. The oily solution is added, as the core material to be encapsulated, to the capsule-forming solution to obtain an emulsion in which the oily solution is dispersed in the form of droplets 6μ in mean diameter.

Subsequently the emulsion is heated to 55° C. with gentle stirring, and a heated mixture of 26.5 parts of 37% aqueous formaldehyde solution and 20 parts of melamine is admixed with the emulsion. The resulting mixture is reacted at 55° C. with heating for 3 hours and then allowed to cool to obtain a capsule dispersion having a pH of 5.0.

Portions of the capsule dispersion are adjusted with sodium hydroxide to the pH values listed in Table 4 except for Comparison Examples 6 and 7, and steam is introduced into the dispersion for 1 hour except for Comparison Examples 6 and 8.

Top sheets of pressure sensitive manifold paper are prepared in the same manner as in Example 1 except that the seven kinds of capsule dispersions are used. Table 4 shows the results.

TABLE 4

| | pH of dispersion | Steam | Amount of formalin (ppm) | Capsule test Resistance to: | | |
|---|---|---|---|---|---|---|
| | | | | Heat | Solvent | Moisture |
| Comp. Ex. 6 | 5.0 | None | 258 | A | A | A |
| Comp. Ex. 7 | 5.0 | Used | 12 | C | C | A |
| Ex. 8 | 6.0 | Used | 13 | A | B | A |
| Ex. 9 | 7.0 | Used | 11 | A | A | A |
| Ex. 10 | 9.0 | Used | 11 | A | A | A |
| Ex. 11 | 11.0 | Used | 12 | A | A | A |
| Comp. Ex. 8 | 9.0 | None | 230 | A | A | A |

EXAMPLE 12 AND COMPARISON EXAMPLE 9 AND 10

Into a blending vessel equipped with a heater, 5 parts of an isobutylene-maleic anhydride copolymer (trade mark "ISOBAM-04," product of Kuraray K.K., Japan), 1.5 parts of sodium hydroxide and 145 parts of water are placed to prepare a solution with heating. The solution is treated with a cationic ion-exchange resin (trade mark "Amberlite IR-120B-H" Rohm and Hass Co., U.S.A.) to adjust the solution to a pH of 3.4. To the solution are added 5 parts of urea and 0.5 part of resorcin to obtain a uniform solution as a capsule-forming solution.

In the same manner as in Example 8, the same core material solution as used therein is dispersed in the capsule-forming solution in the form of oily droplets 6μ in mean diameter to prepare an emulsion. Subsequently 12.5 parts of 37% aqueous solution of formaldehyde is added to the emulsion, and the mixture is heated to 55° C. with gentle stirring, maintained at this temperature for 2 hours and then allowed to cool to obtain a capsule dispersion having a pH of 3.5.

A portion of the dispersion is used as a specimen for Comparison Example 9. Steam is introduced into another portion of the dispersion for 30 minutes for Comparison Example 10. Another portion of the dispersion is adjusted to a pH of 8.5 with ammonia, and steam is introduced thereinto for 30 minutes for Example 12. Determination of formaldehyde and capsule test are conducted for these portions in the same manner as in Example 1. Table 5 shows the results.

TABLE 5

| | pH of dispersion | Steam | Amount of formalin (ppm) | Capsule test Resistance to: | | |
|---|---|---|---|---|---|---|
| | | | | Heat | Solvent | Moisture |
| Comp. Ex. 9 | 3.5 | None | 160 | A | A | A |
| Comp. Ex. 10 | 3.5 | Used | 12 | C | C | A |
| Ex. 12 | 8.5 | Used | 11 | A | A | A |

In Example 12, the ammonia used for pH adjustment is partly removed by the treatment with steam, so that the treated dispersion has a pH of 6.0.

The results listed in Tables 4 and 5 reveal that the residual formaldehyde is efficiently removed from the dispersion of Examples 8 to 12 without degrading the capsules in any way. In Comparison Examples 7 and 10, however, the steam introduced into the dispersions at a pH of lower than 6.0 seriously impairs the resistance of the capsules to heat and solvent, failing to afford useful pressure sensitive manifold paper.

We claim:

1. A process for removing an aldehyde from a liquid dispersion of microcapsules with use of an aldehyde to form the wall-forming film of the capsules characterized in that:
   the microcapsules are formed of a wall-forming film of an aldehyde polycondensation resin produced in the presence of an acid catalyst in a liquid,
   a gas is introduced into the liquid dispersion following complete formation of the microcapsules;
   the liquid dispersion has a protective colloid incorporated therein before the gas is introduced thereinto, and the liquid dispersion is heated to a temperature of at least 50° C. before the gas is introduced thereinto.

2. A process as defined in claim 1 wherein the gas is an inert gas.

3. A process as defined in claim 2 wherein the inert gas is at least one of nitrogen gas, helium gas, argon gas, carbon dioxide gas and air.

4. A process as defined in claim 2 wherein the microcapsule dispersion is heated to a temperature of at least 70° C.

5. A process as defined in claim 4 wherein the dispersion is heated at a pH of at least 6.0.

6. A process as defined in claim 5 wherein the pH is 7.0 to 12.0.

7. A process as defined in claim 1 wherein the gas is steam.

8. A process as defined in claim 7 wherein steam is introduced into the dispersion at a pH of at least 6.0.

9. A process as defined in claim 7 wherein the pH is 7.0 to 12.0.

* * * * *